US008550571B2

(12) United States Patent
Yamamoto et al.

(10) Patent No.: US 8,550,571 B2
(45) Date of Patent: Oct. 8, 2013

(54) BRAKE CONTROL APPARATUS

(75) Inventors: Takayuki Yamamoto, Aichi-gun (JP); Koji Watanabe, Kariya (JP); Takashi Satou, Okazaki-shi (JP)

(73) Assignees: Toyota Jidosha Kabushiki Kaisha, Toyota-shi (JP); Advics Co., Ltd., Kariya (JP)

( * ) Notice: Subject to any disclaimer, the term of this patent is extended or adjusted under 35 U.S.C. 154(b) by 291 days.

(21) Appl. No.: 13/062,982

(22) PCT Filed: Sep. 30, 2009

(86) PCT No.: PCT/IB2009/006998
§ 371 (c)(1),
(2), (4) Date: Mar. 9, 2011

(87) PCT Pub. No.: WO2010/038135
PCT Pub. Date: Apr. 8, 2010

(65) Prior Publication Data
US 2011/0175437 A1     Jul. 21, 2011

(30) Foreign Application Priority Data

Oct. 1, 2008 (JP) ................................. 2008-256796

(51) Int. Cl.
*B60T 13/18* (2006.01)

(52) U.S. Cl.
USPC ......................................... 303/11; 303/116.1

(58) Field of Classification Search
USPC ............... 303/10, 11, 116.1–116.4, 15, 115.4
See application file for complete search history.

(56) References Cited

U.S. PATENT DOCUMENTS

| 4,834,469 | A | 5/1989 | Kohno et al. |
| 5,221,125 | A | 6/1993 | Okochi et al. |
| 6,234,588 | B1 | 5/2001 | Sawada |
| 6,604,795 | B2 * | 8/2003 | Isono et al. ..................... 303/11 |
| 6,957,870 | B2 * | 10/2005 | Kagawa et al. ............ 303/113.4 |
| 2007/0108837 | A1 | 5/2007 | Ohkubo et al. |
| 2007/0114844 | A1 | 5/2007 | Maki et al. |

FOREIGN PATENT DOCUMENTS

| CN | 1962330 A | 5/2007 |
| CN | 1966322 A | 5/2007 |
| DE | 41 18 597 C2 | 12/1991 |

(Continued)

OTHER PUBLICATIONS

International Search Report Issued Dec. 22, 2009 in PCT/IB09/006998 filed Sep. 30, 2009.

(Continued)

*Primary Examiner* — Melanie Torres Williams
(74) *Attorney, Agent, or Firm* — Oblon, Spivak, McClelland, Maier & Neustadt, L.L.P.

(57) ABSTRACT

A brake control apparatus is equipped with a plurality of fluid pressure adjusting valves that have opening degrees thereof adjusted through energization control to adjust the fluid pressures, a plurality of valves that are provided in series with at least two of the fluid pressure adjusting valves, are closed during stoppage of energization to hold the fluid pressures, and a brake ECU. The brake ECU controls fluid pressure adjustment achieved by supplying the fluid pressures to the wheel cylinders respectively, opening the communication valves, and adjusting the opening degrees of the fluid pressure adjusting valves to adjust the fluid pressures respectively, and fluid pressure holding achieved by closing the communication valves, opening the fluid pressure adjusting valves, and holding the fluid pressures by means of the communication valves respectively.

11 Claims, 6 Drawing Sheets

(56) References Cited

FOREIGN PATENT DOCUMENTS

| | | |
|---|---|---|
| DE | 198 43 220 A1 | 8/1999 |
| EP | 0 280 740 | 9/1988 |
| EP | 0 937 623 | 8/1999 |
| EP | 1 795 416 | 6/2007 |
| JP | 2000-280881 | 10/2000 |
| JP | 2004-210110 | 7/2004 |
| JP | 2005 344865 | 12/2005 |
| JP | 2006-264675 | 10/2006 |
| JP | 2007-131247 A | 5/2007 |
| JP | 2007 137258 | 6/2007 |
| JP | 2007-216765 | 8/2007 |
| WO | 99 39954 | 8/1999 |

OTHER PUBLICATIONS

Office Action issued Aug. 16, 2012, in Korean Patent Application No. 10-2011-7006552 with English translation.

Office Action issued Mar. 5, 2013 in Chinese Patent Application No. 200980139133.4 (with partial English translation).

* cited by examiner

BRAKE CONTROL APPARATUS

BACKGROUND OF THE INVENTION

1. Field of the Invention

The invention relates to a brake control apparatus.

2. Description of the Related Art

There is known a brake control apparatus that electronically controls, by means of an actuator, the supply of brake fluid to wheel cylinders via a fluid pressure circuit to thereby adjust the fluid pressures supplied to the respective wheel cylinders (e.g., see Japanese Patent Application Publication No. 2007-437258 (JP-A-2007-437258)).

The brake control apparatus described in Japanese Patent Application Publication No. 2007-137258 (JP-A-2007-137258) is equipped with a main conduit that couples respective wheel cylinders to a master cylinder including a master reservoir storing brake fluid therein, pumps that suck in/discharge the brake fluid stored in the master reservoir to pressurize the respective wheel cylinders, pressure regulation conduits that are provided in parallel with the pumps respectively, and normally open linear valves that are disposed in the pressure regulation conduits respectively. Further, the brake control apparatus is equipped with a subsidiary conduit that couples the master cylinder to one or some of the wheel cylinders, and a control valve that is provided in the subsidiary conduit, for the sake of a failsafe in the event of an abnormality in brake control via the main conduit. In addition, the brake control apparatus is equipped with normally closed valves downstream of the linear valves respectively to prevent the brake fluid supplied to the wheel cylinders from flowing toward the main conduit side in supplying fluid pressures to the wheel cylinders respectively via the subsidiary conduit.

In the configuration of Japanese Patent Application Publication No. 2007-137258 (JP-A-2007-137258), during normal brake control, the pumps supply the brake fluid from the master reservoir to the respective wheel cylinders, thereby supplying fluid pressures to the wheel cylinders respectively and applying braking forces to wheels respectively. Further, the normally closed valves are energized to be opened, and the opening degrees of the linear valves are adjusted through energization control to adjust and hold the fluid pressures supplied to the wheel cylinders respectively. Thus, in the configuration of Japanese Patent Application Publication No. 2007-137258 (JP-A-2007-137258), the linear valves and the normally closed valves must be held energized to hold the fluid pressures supplied to the wheel cylinders respectively.

On the other hand, the linear valves and the normally closed valves are loaded through energization. Accordingly, in order to lengthen the period in which the respective valves operate normally and hence enhance the operating reliability of the brake control apparatus, it is desirable to minimize the period of energization of the linear valves and the normally closed valves.

SUMMARY OF THE INVENTION

The invention provides a brake control apparatus that offers higher operating reliability.

A brake control apparatus according to a first aspect of the invention is a brake control apparatus that supplies a brake fluid to a wheel cylinder via a fluid pressure circuit to thereby supply a fluid pressure to the wheel cylinder and apply a braking force to a wheel through the fluid pressure. This brake control apparatus is equipped with a fluid pressure source that is provided in the fluid pressure circuit to supply a fluid pressure to the wheel cylinder, a fluid pressure adjusting valve that is open during stoppage of energization and has an opening degree thereof adjusted through energization control to adjust the fluid pressure supplied to the wheel cylinder, a communication valve that is provided in series with the fluid pressure adjusting valve, is closed during stoppage of energization to hold the fluid pressure supplied to the wheel cylinder, and is opened through energization, a fluid pressure sensor that detects the fluid pressure, and a control portion that controls driving of the fluid pressure source and energization of the fluid pressure adjusting valve and the communication valve. The control portion controls fluid pressure adjustment achieved by driving the fluid pressure source to supply a fluid pressure to the wheel cylinder, opening the communication valve, and adjusting the opening degree of the fluid pressure adjusting valve to adjust the fluid pressure, and fluid pressure holding achieved by closing the communication valve, opening the fluid pressure adjusting valve, and holding the fluid pressure by means of the communication valve.

According to this aspect of the invention, a brake control apparatus that offers higher operating reliability can be provided.

The control portion may close the fluid pressure adjusting valve, then close the communication valve, and subsequently open the fluid pressure adjusting valve to hold the fluid pressure by means of the communication valve. In this case, pulsations can be restrained from being caused through the opening/closing of the respective valves.

The control portion may close the fluid pressure adjusting valve, then open the communication valve, and subsequently adjust the opening degree of the fluid pressure adjusting valve to release the fluid pressure supplied to the wheel cylinder. In this case, pulsations can be restrained from being caused through the opening/closing of the respective valves.

The control portion may make a fluid leak determination to detect a leak of fluid from the communication valve from a detection result of the fluid pressure sensor while the communication valve holds the fluid pressure. In this case, the operating reliability of the brake control apparatus can further be enhanced.

The control portion may consecutively open/close the communication valve a plurality of times when the leak of fluid from the communication valve is detected in the fluid leak determination. In this case, foreign matters stuck to the communication valve can be removed, and the operating reliability of the brake control apparatus can further be enhanced.

The control portion may open the communication valve and drive the fluid pressure source to cause brake fluid to flow when the leak of fluid from the communication valve is detected in the fluid leak determination. In this case, foreign matters in brake fluid can be diffused, and the operating reliability of the brake control apparatus can further be enhanced.

Further, the brake control apparatus may be equipped with an additional fluid pressure circuit for supplying the brake fluid to the wheel cylinder, and a shutoff valve that is provided in the additional fluid pressure circuit and is closed through energization to enable shutoff of supply of the brake fluid to the wheel cylinder. The control portion may close the communication valve, open the shutoff valve, and drive the fluid pressure source to cause the brake fluid to flow when a fluid leak from the communication valve is detected in the fluid leak determination. In this case, foreign matters in the brake fluid can further be diffused, and the operating reliability of the brake control apparatus can further be enhanced.

Furthermore, the communication valve may be provided downstream of the fluid pressure adjusting valve, and a return conduit that couples a region downstream of the communication valve to a reservoir tank for storing the brake fluid therein may be provided. The fluid pressure source may supply the brake fluid from the reservoir tank to the wheel cylinder via the fluid pressure circuit, and the brake fluid supplied to the wheel cylinder may be returned to the reservoir tank via the return conduit. In this case, the treatment of diffusing foreign matters in the brake fluid can further be simplified.

The fluid leak determination may be made at a timing when the fluid pressure is supplied to the wheel cylinder to apply the braking force to the wheel. In this case as well, the operating reliability of the brake control apparatus can be enhanced.

The fluid leak determination may be made at a timing when a user gets into a vehicle. In this case as well, the operating reliability of the brake control apparatus can be enhanced.

The fluid leak determination may be made at a timing when an ignition switch is turned off to stop braking. In this case as well, the operating reliability of the brake control apparatus can be enhanced.

According to the invention, a brake control apparatus that offers higher operating reliability can be provided.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE EMBODIMENTS

Modes for carrying out the invention (hereinafter referred to as embodiments of the invention) will be described hereinafter in detail with reference to the drawings. In the description of the drawings, like elements are denoted by like reference symbols, and the same description is omitted when appropriate.

Figure 1:
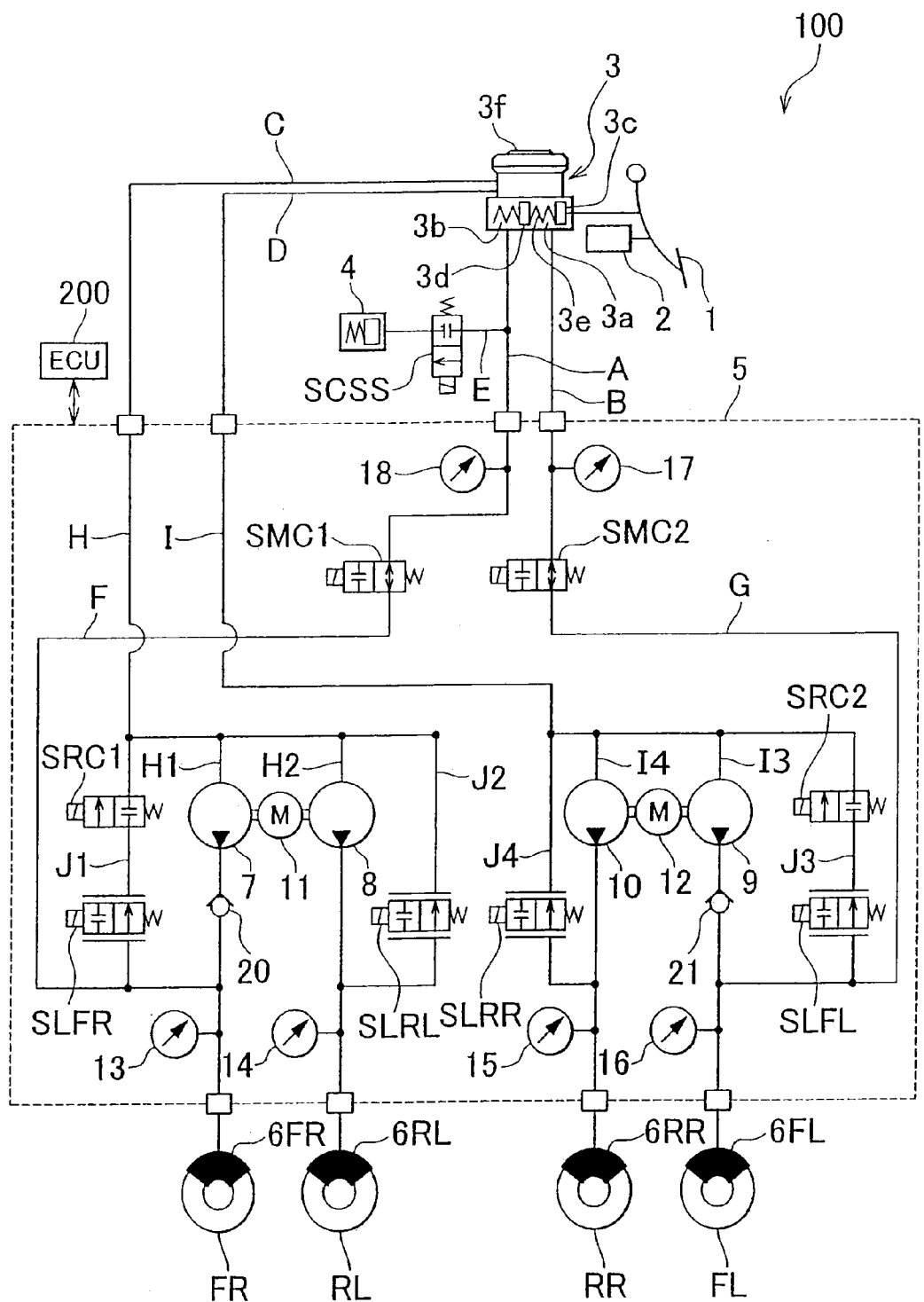
FIG. 1 is a schematic diagram of a brake control apparatus according to the first embodiment of the invention.

FIG. 1 is a schematic diagram of a brake control apparatus 100 according to the first embodiment of the invention. The configuration of the brake control apparatus 100 according to this embodiment of the invention will be described hereinafter with reference to FIG. 1. In this case, an example in which the brake control apparatus 100 according to this embodiment of the invention is applied to a vehicle designed with a fluid pressure circuit of an X pipeline equipped with a pipeline system for a front-right wheel and a rear-left wheel and a pipeline system for a front-left wheel and a rear-right wheel will be described.

As shown in FIG. 1, the brake control apparatus 100 is equipped with a brake pedal 1, a stroke sensor 2, a master cylinder 3, a stroke control valve SCSS, a stroke simulator 4, a brake fluid pressure control actuator 5, wheel cylinders 6FL, 6FR, 6RL, and 6RR. Further, the brake control apparatus 100 is equipped with a brake ECU 200 as a control portion that controls the operations of respective portions of the brake control apparatus 100.

When a driver depresses the brake pedal 1, a pedal stroke as an operation amount of the brake pedal 1 is input to the stroke sensor 2, and a detection signal corresponding to the pedal stroke is output from the stroke sensor 2. This detection signal is input to the brake ECU 200, and the brake ECU 200 detects the pedal stroke of the brake pedal 1. Although the stroke sensor 2 is mentioned herein as an example of an operation amount sensor for detecting an operation amount of a brake operation member, a depression force sensor for detecting a depression force applied to the brake pedal 1 or the like may be employed instead.

A push rod for transmitting a pedal stroke to the master cylinder 3 or the like is connected to the brake pedal 1. When this push rod or the like is pressed, master cylinder pressures are thereby generated in a primary chamber 3a and a secondary chamber 3b, with which the master cylinder 3 is equipped.

The master cylinder 3 is equipped with a primary piston 3c and a secondary piston 3d, which define the primary chamber 3a and the secondary chamber 3b. The primary piston 3c and the secondary piston 3d are designed to receive an elastic force of a spring 3e and hence be pressed to return the brake pedal 1 to an initial position side thereof when the brake pedal 1 is not depressed.

A conduit B extending toward the brake fluid pressure control actuator 5 is coupled to the primary chamber 3a of the master cylinder 3, and a conduit A extending toward the brake fluid pressure control actuator 5 is coupled to the secondary chamber 3b of the master cylinder 3.

Further, the master cylinder 3 is equipped with a reservoir tank 3f. The reservoir tank 3f is connected to the primary chamber 3a and the secondary chamber 3b via passages (not shown) respectively when the brake pedal 1 is at the initial position thereof. The reservoir tank 3f supplies brake fluid into the master cylinder 3, and stores surplus brake fluid in the master cylinder 3. Conduits C and D extending toward the brake fluid pressure control actuator 5 are coupled to the reservoir tank 3f.

The stroke simulator 4 is connected to a conduit E leading to the conduit A, and plays the role of accommodating brake fluid in the secondary chamber 3b. The conduit E is equipped with a stroke control valve SCSS constituted by a normally closed two-position valve that can control the state of communication/shutoff of the conduit E. The stroke control valve SCSS can control the flow of brake fluid to the stroke simulator 4.

The brake fluid pressure control actuator 5 is equipped with a conduit F coupled to the conduit A so as to connect the secondary chamber 3b of the master cylinder 3 to the wheel cylinder 6FR corresponding to a front-right wheel FR. The conduit F is equipped with a shutoff valve SMC1. The shutoff valve SMC1 is a two-position valve that is open (in a communication state) during stoppage of energization and is closed (in a shutoff state) during energization. The shutoff valve SMC1 controls the state of communication/shutoff of the conduit F, and the supply of brake fluid to the wheel cylinder 6FR via the conduits A and F is thereby controlled.

Further, the brake fluid pressure control actuator 5 is equipped with a conduit G coupled to the conduit B so as to connect the primary chamber 3a of the master cylinder 3 to the wheel cylinder 6FL corresponding to a front-left wheel FL. The conduit G is equipped with a shutoff valve SMC2. The shutoff valve SMC2 is a two-position valve that is open during stoppage of energization and is closed during energization. The shutoff valve SMC2 controls the state of communication/shutoff of the conduit G, and the supply of brake fluid to the wheel cylinder 6FL via the conduits B and G is thereby controlled.

Further, the brake fluid pressure control actuator 5 is equipped with a conduit H connected to the conduit C extended from the reservoir tank 3f, and a conduit I connected to the conduit D. The conduit H bifurcates into two conduits H1 and H2, which are connected to the wheel cylinders 6FR and 6RL respectively. Further, the conduit I bifurcates into two conduits I3 and I4, which are connected to the wheel cylinders 6FL and 6RR respectively. The wheel cylinders 6RL and 6RR correspond to a rear-left wheel RL and a rear-right wheel RR respectively.

The conduits H1, H2, I3, and I4 are equipped with pumps 7, 8, 9, and 10 respectively. The respective pumps 7 to 10 are constituted by, for example, trochoid pumps exhibiting excellent tranquility. The pumps 7 and 8 are driven by a first motor 11, and the pumps 9 and 10 are driven by a second motor 12. In this embodiment of the invention, the pumps 7, 8, 9, and 10, the first motor 11, and the second motor 12 constitute a fluid pressure source.

Further, the pumps 7 to 10 are equipped with conduits J1, J2, J3, and J4 in parallel therewith respectively. The conduit J1 connected in parallel to the pump 7 is equipped with the communication valve SRC1 and the fluid pressure adjusting valve SLFR, which are connected in series to each other. The communication valve SRC1 and the fluid pressure adjusting valve SLFR are so disposed as to be located on an intake port side of the pump 7 (on a downstream side in a direction in which break fluid flows through the conduit J1) and on a discharge port side of the pump 7 (on an upstream side in the direction in which break fluid flows through the conduit J1) respectively. That is, the communication valve SRC1 can control the communication/shutoff between the reservoir tank 3f and the fluid pressure adjusting valve SLFR. The communication valve SRC1 is a two-position valve that is closed during stoppage of energization and is open during energization. The fluid pressure adjusting valve SLFR is a linear valve that is open during stoppage of energization, is closed during energization, and has an opening degree thereof adjusted through energization control. It should be noted that the communication valve SRC1 may be a linear valve.

The conduit J2 connected in parallel with the pump 8 is equipped with the fluid pressure adjusting valve SLRL. As is the case with the fluid pressure adjusting valve SLFR, the fluid pressure adjusting valve SLRL is a linear valve.

The conduit J3 connected in parallel with the pump 9 is equipped with the communication valve SRC2 and the fluid pressure adjusting valve SLFL, which are connected in series to each other. The communication valve SRC2 is so disposed as to be located on the intake port side of the pump 9 (on a downstream side in a direction in which brake fluid flows through the conduit J3), and the fluid pressure adjusting valve SLFL is so disposed as to be located on the discharge port side of the pump 9 (on an upstream side in the direction in which brake fluid flows through the conduit J3). That is, the communication valve SRC2 can control the communication/shutoff between the reservoir tank 3f and the fluid pressure adjusting valve SLFL. The communication valve SRC2 is a two-position valve that is closed during stoppage of energization and is open during energization. The fluid pressure adjusting valve SLFL is a linear valve that is open during stoppage of energization, is closed during energization, and has an opening degree thereof adjusted through energization control. It should be noted that the communication valve SRC2 may be a linear valve.

The conduit J4 connected in parallel with the pump 10 is equipped with the fluid pressure adjusting valve SLRR. As is the case with the fluid pressure adjusting valve SLFL, the fluid pressure adjusting valve SLRR is a linear valve.

The fluid pressure sensors 13, 14, 15, and 16 are disposed between the pumps 7 to 10 and the wheel cylinders 6FR, 6FL, 6RR, and 6RL respectively, and detect fluid pressures in the wheel cylinders 6FR, 6FL, 6RR, and 6RL respectively. Further, the fluid pressure sensors 17 and 18 are disposed also upstream of the shutoff valves SMC1 and SMC2 (on the master cylinder 3 side) in the conduits F and G respectively, and detect master cylinder pressures generated in the primary chamber 3a of the master cylinder 3 and the secondary chamber 3b of the master cylinder 3 respectively.

Furthermore, the discharge port of the pump 7 for pressurizing the wheel cylinder 6FR and the discharge port of the pump 9 for pressurizing the wheel cylinder 6FL are equipped with check valves 20 and 21 respectively. The check valves 20 and 21 are provided to prohibit brake fluid from flowing from the wheel cylinders 6FR, 6FL sides to the pumps 7, 9 sides respectively. This structure constitutes the brake fluid pressure control actuator 5.

In the brake control apparatus 100 having the aforementioned configuration, a fluid pressure circuit that includes a circuit coupling the reservoir tank 3f to the wheel cylinders 6FR and 6RL through the conduits C, H, H1, and H2 and a circuit of the conduits J1 and J2 connected in parallel with the pumps 7 and 8 respectively, and a fluid pressure circuit (an additional fluid pressure circuit) that couples the secondary chamber 3b to the wheel cylinder 6FR through the conduits A and F constitute a first pipeline system.

Further, a fluid pressure circuit that includes a circuit coupling the reservoir tank 3f to the wheel cylinders 6FL and 6RR through the conduits D, I, I3, and I4 and a circuit of the conduits J3 and J4 connected in parallel with the pumps 9 and 10 respectively, and a fluid pressure circuit (an additional fluid pressure circuit) coupling the primary chamber 3a to the wheel cylinder 6FL through the conduits B and G constitute a second pipeline system.

Detection signals of the stroke sensor 2 and the respective fluid pressure sensors 13 to 18 are then input to the brake ECU 200. Control signals for driving the stroke control valve SCSS, the shutoff valves SMC1 and SMC2, the communication valves SRC1 and SRC2, the fluid pressure adjusting valves SLFR, SLFL, SLRR, and SLRL, the first motor 11, and the second motor 12 are output from the brake ECU 200 on the basis of a pedal stroke, fluid pressures in the wheel cylinders, and a master cylinder pressure, which are obtained from those detection signals respectively.

In the brake control apparatus 100 according to this embodiment of the invention, the wheel cylinders 6FR and 6RL and the wheel cylinders 6FL and 6RR are connected to the reservoir tank 3f by the separate conduits C and H and the separate conduits D and I respectively. Therefore, a larger amount of brake fluid can be supplied to the respective wheel cylinders 6FR, 6RL, 6FL, and 6RR than in a case where the wheel cylinders 6FR, 6RL, 6FL, and 6RR are connected to the reservoir tank 3f by a single conduit. Further, even when one of the conduits breaks down, the other conduit allows brake fluid to be supplied to the wheel cylinder coupled thereto. Therefore, it is possible to avoid a situation in which all the wheel cylinders cannot be pressurized. As a result, the reliability of the brake control apparatus 100 is enhanced.

Subsequently, the operation of the brake control apparatus 100 according to this embodiment of the invention during normal braking and the operation of the brake control apparatus 100 according to this embodiment of the invention in the event of an abnormality in the brake control apparatus 100 (hereinafter referred to as "during an abnormality") will be described separately. The brake ECU 200 determines, on the basis of a conventionally conducted initial check or the like, whether or not an abnormality has occurred.

(During Normal Brake Operation) Normally, when the brake pedal 1 is depressed and a detection signal of the stroke sensor 2 is input to the brake ECU 200, the brake ECU 200 controls the respective valves SCSS, SMC1, SMC2, SRC1, SRC2, SLFR, SLFL, SLRR, and SLRL, the first motor 11, and the second motor 12 to the following states respectively. That is, the energization of both the shutoff valves SMC1 and SMC2 is started, and the energization of both the communication valves SRC1 and SRC2 is also started. Thus, the shutoff valves SMC1 and SMC2 assume a shutoff state, and the communication valves SRC1 and SRC2 assume a communication state.

Further, the opening degrees of the fluid pressure adjusting valves SLFR, SLFL, SLRR, and SLRL are adjusted by controlling the amounts of energization thereof. The energization of the stroke control valve SCSS is started. Thus, the stroke simulator 4 communicates with the secondary chamber 3b through the conduits A and E. Even when the respective pistons 3c and 3d move upon depression of the brake pedal 1, brake fluid in the secondary chamber 3b moves to the stroke simulator 4. Accordingly, the brake pedal 1 can be depressed without causing a sense of depressing a hard plate (plate feeling) due to a high master cylinder pressure.

Furthermore, the energization of both the first motor 11 and the second motor 12 is started, and the pumps 7 to 10 suck in/discharge brake fluid. When the pumps 7 to 10 perform pump operation, brake fluid is supplied to the respective wheel cylinders 6FR, 6FL, 6RR, and 6RL. At this moment, the shutoff valves SMC1 and SMC2 are shut off. Therefore, the fluid pressures downstream of the pumps 7 to 10, namely, the fluid pressures in the respective wheel cylinders 6FR, 6FL, 6RR, and 6RL increase. The communication valves SRC1 and SRC2 then assume a communication state, and the opening degrees of the fluid pressure adjusting valves SLFR, SLFL, SLRR, and SLRL are controlled respectively. Therefore, the fluid pressures in the wheel cylinders 6FR, 6FL, 6RR, and 6RL are adjusted in accordance with the opening degrees respectively.

The brake ECU 200 then monitors the fluid pressures supplied to the wheel cylinders 6FR, 6FL, 6RR, and 6RL on the basis of detection signals of the fluid pressure sensors 13 to 16 respectively, and adjusts the amounts of energization of the first motor 11 and the second motor 12 to control the rotational speeds of the first motor 11 and the second motor 12 respectively. Further, the brake ECU 200 also controls the amounts of energization of the fluid pressure adjusting valves SLFR, SLFL, SLRR, and SLRL such that the fluid pressures in the wheel cylinders 6FR, 6FL, 6RR, and 6RL become equal to desired values respectively.

Thus, a braking force corresponding to the pedal stroke of the brake pedal 1 is generated.

(Brake Operation During Abnormality) During an abnormality, the brake ECU 200 cannot output a control signal, or the respective valves SCSS, SMC1, SMC2, SRC1, SRC2, SLFR, SLFL, SLRR, and SLRL, the first motor 11, and the second motor 12 may not be driven normally. Thus, the energization of all the valves SCSS, SMC1, SMC2, SRC1, SRC2, SLFR, SLFL, SLRR, and SLRL, the first motor 11, and the second motor 12 is stopped.

That is, the energization of the shutoff valves SMC1 and SMC2 is stopped. Therefore, the shutoff valves SMC1 and SMC2 assume a communication state. Further, the energization of the communication valves SRC1 and SRC2 is also stopped. Therefore, the communication valves SRC1 and SRC2 assume a shutoff state. In addition, the energization of the fluid pressure adjusting valves SLFR, SLFL, SLRR, and SLRL is also stopped, and hence the fluid pressure adjusting valves SLFR, SLFL, SLRR, and SLRL assume a communication state. The energization of the stroke control valve SCSS is also stopped. Therefore, the stroke simulator 4 is shut off from the secondary chamber 3b. Further, the energization of both the first motor 11 and the second motor 12 is stopped, and the suction/discharge of brake fluid by the pumps 7 to 10 is also stopped.

In this state, the primary chamber 3a of the master cylinder 3 is in communication with the wheel cylinder 6FL via the conduits B, G, and I3, and the secondary chamber 3b is in communication with the wheel cylinder 6FR through the conduits A, F, and H1. Thus, when the brake pedal 1 is depressed and a push rod or the like is pressed in accordance with a pedal stroke of the brake pedal 1 to generate master cylinder pressures in the primary chamber 3a of the master cylinder 3 and the secondary chamber 3b of the master cylinder 3, the master cylinder pressures are transmitted to the wheel cylinders 6FR and 6FL respectively. Thus, braking forces are applied to both the front wheels FR and FL respectively.

It should be noted herein that the communication valve SRC1 is disposed between the conduit F and the conduit H, and the communication valve SRC2 is disposed between the conduit G and the conduit I in the brake control apparatus 100. Therefore, during an abnormality, the communication valves SRC1 and SRC2 shut off the master cylinder 3 from the reservoir tank 3f. Thus, it is possible to prevent a state where the wheel cylinders 6FR and 6FL cannot be pressurized due to the flow of brake fluid in the master cylinder 3 to the reservoir tank 3f side through the conduit H or the conduit I when the brake pedal 1 is depressed.

During the operation in the event of such an abnormality, the fluid pressures in the wheel cylinders 6FR and 6FL are generated in the conduits H1 and I3 respectively. However, the conduits H1 and I3 are provided with the check valves 20 and 21 respectively. Therefore, the fluid pressures in the wheel cylinders 6FR and 6FL can be prevented from being applied to the pumps 7 and 9 respectively, causing a leak of brake fluid from the pumps 7 and 9 respectively, and decreasing.

The brake control apparatus 100 according to this embodiment of the invention operates as described above. In the brake control apparatus 100 according to this embodiment of the invention, the inputting of the pedal stroke of the brake pedal 1 is not separated from the supply of brake fluid from the master cylinder 3. Thus, even when some abnormality occurs in the brake control apparatus 100, the brake control apparatus 100 can reliably generate braking forces in the wheels without depending on the control performed by the brake ECU 200.

Figure 2:
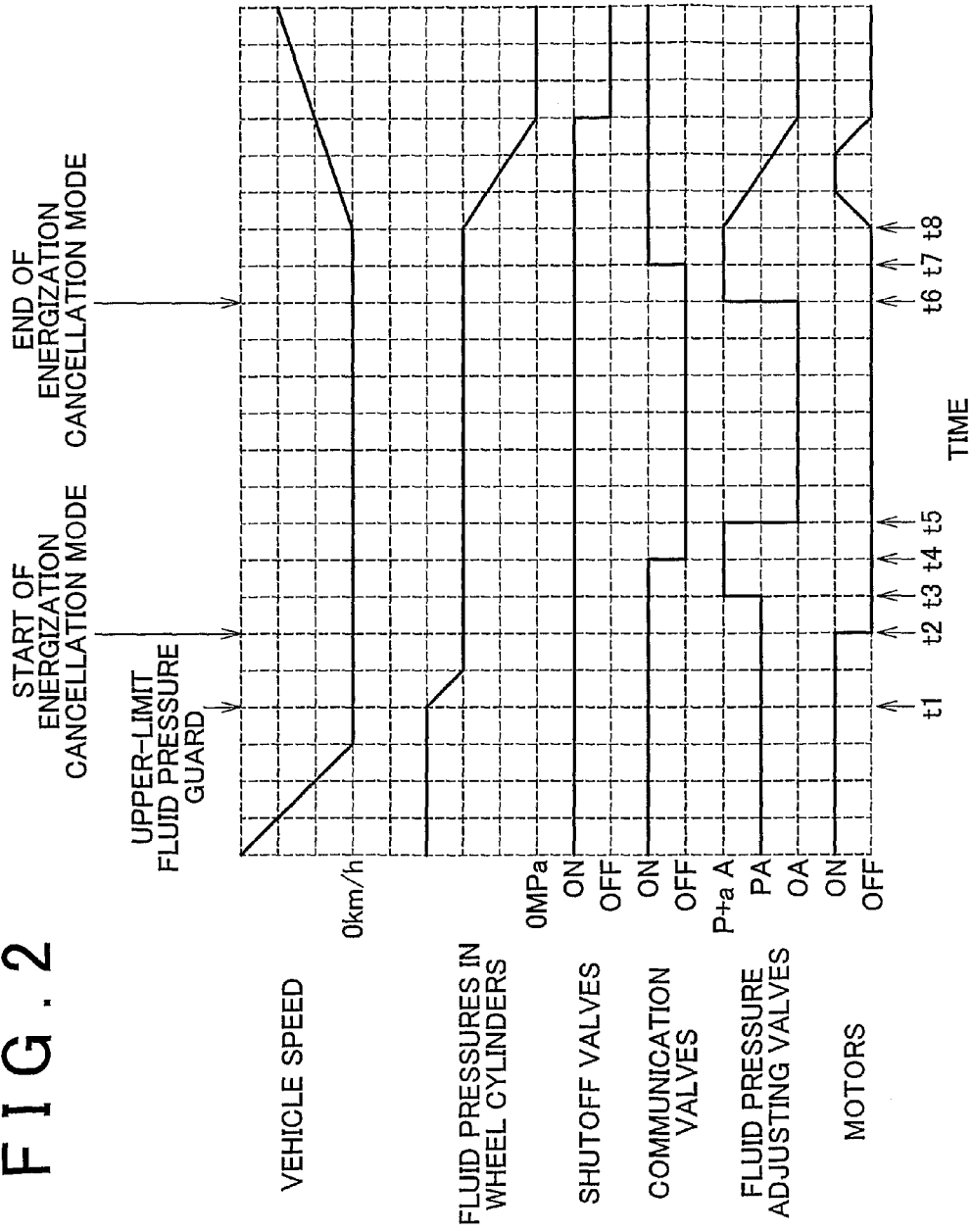
FIG. 2 is a timing chart for explaining an energization cancellation mode.

Subsequently, an energization cancellation mode in the brake control apparatus 100 according to this embodiment of the invention will be described with reference to FIG. 2. FIG. 2 is a timing chart for explaining the energization cancellation mode. In the energization cancellation mode, a similar processing is performed in the system for supplying a fluid pressure to the wheel cylinder 6FR and the system for supplying a fluid pressure to the wheel cylinder 6FL. Therefore, the system for supplying a fluid pressure to the wheel cylinder 6FR will be described herein as an example. The energization cancellation mode is established under the control of the brake ECU 200.

As shown in FIG. 2, for example, when the driver depresses the brake pedal 1, braking forces are applied to the wheels, and the speed of the vehicle is reduced to 0 km/h, an upper-limit fluid pressure guard processing is performed under the control of the brake ECU 200 at a time t1 after the lapse of a predetermined time. In this upper-limit fluid pressure guard processing, the opening degree of the fluid pressure adjusting valve SLFR is adjusted such that the fluid pressure in the wheel cylinder 6FR becomes equal to a predetermined target fluid pressure. In FIG. 2, changes in the amount of energization of the fluid pressure adjusting valve SLFR in the upper-limit fluid pressure guard processing are not shown in FIG. 2.

After the fluid pressure in the wheel cylinder 6FR falls through the upper-limit fluid pressure guard processing, the energization cancellation mode is started at a time t2. For example, when the driver depresses the brake pedal 1 to brake the wheels and the speed of the vehicle consequently becomes equal to zero, the energization cancellation mode is established after the lapse of a predetermined time. It should be noted herein that the predetermined time is set such that, for example, a frequent changeover between the establishment and end of the energization cancellation mode can be avoided.

In the energization cancellation mode, first of all, the energization of the first motor 11 is stopped, and the suction/discharge of brake fluid by the pump 7 is thereby stopped. Then at a time t3, a current of P+αA is caused to flow through the fluid pressure adjusting valve SLFR, whose opening degree has been so adjusted as to correspond to a target fluid pressure of the upper-limit fluid pressure guard processing through the supply of a current of P A, and the fluid pressure adjusting valve SLFR is completely closed. Thus, the fluid pressure supplied to the wheel cylinder 6FR does not change, and the performance of fluid pressure holding is improved. At this moment, the rotational speed of the first motor 11 and the opening degree of the fluid pressure adjusting valve SLFR may be gradually changed to prevent the occurrence of pulsations resulting from an abrupt creation of a pressure difference. Further, in this embodiment of the invention, considering that the first motor 11 continues to rotate due to inertia even after the stoppage of energization, the energization of the first motor 11 is stopped prior to the closure of the fluid pressure adjusting valve SLFR. However, the energization of the first motor 11 may be stopped simultaneously with the closure of the fluid pressure adjusting valve SLFR. Further, the fluid pressure adjusting valve SLFR may be closed prior to the stoppage of energization of the first motor 11.

After the fluid pressure adjusting valve SLFR is completely closed, the energization of the communication valve SRC1 is stopped to close the communication valve SRC1 at a time t4. After that, the energization of the fluid pressure adjusting valve SLFR is stopped to open the fluid pressure adjusting valve SLFR at a time t5. Thus, the fluid pressure in the wheel cylinder 6FR is held while both the communication valve SRC1 and the fluid pressure adjusting valve SLFR are not energized. Since the fluid pressure in the wheel cylinder 6FR can be held while both the communication valve SRC1 and the fluid pressure adjusting valve SLFR are not energized, the loads applied to the respective valves through energization can be reduced, and the amount of electric power consumption can be reduced. The opening degree of the fluid pressure adjusting valve SLFR may be gradually changed to prevent the occurrence of pulsations resulting from abrupt creation of a pressure difference.

It should be noted herein that control is performed in the energization cancellation mode according to this embodiment of the invention such that the fluid pressure adjusting valve SLFR is completely closed, the communication valve SRC1 is then closed, and thereafter the fluid pressure adjusting valve SLFR is completely opened. Before the energization cancellation mode is established, the fluid pressure adjusting valve SLFR opens by a predetermined amount to cause brake fluid to flow such that the fluid pressure in the wheel cylinder 6FR becomes equal to the target fluid pressure of the upper-limit fluid pressure guard. Therefore, when the communication valve SRC1 is closed before the fluid pressure adjusting valve SLFR is completely closed, a pressure is abruptly applied to the closed communication valve SRC1, pulsations are thereby caused, and abnormal noise and vibrations occur. On the other hand, the communication valve SRC1 can be closed while no pressure is abruptly applied to the communication valve SRC1 despite the closure of the communication valve SRC1, by closing the communication valve SRC1 after the complete closure of the fluid pressure adjusting valve SLFR as in this embodiment of the invention. Therefore, the occurrence of pulsations can be suppressed, and as a result, the occurrence of abnormal noise and vibrations can be suppressed.

When an energization cancellation mode end command is issued through, for example, depression of an accelerator pedal at a time t6 after the fluid pressure adjusting valve SLFR is completely opened, an energization cancellation mode end processing is performed. In the energization cancellation mode end processing, a current of P+αA is first caused to flow through the fluid pressure adjusting valve SLFR at the time t6, and the fluid pressure adjusting valve SLFR is completely closed. After that, the energization of the communication valve SRC1 is started to open the communication valve SRC1 at a time t7. Then at a time t8, the energization of the fluid pressure adjusting valve SLFR is adjusted to gradually open the fluid pressure adjusting valve SLFR, and also, the energization of the first motor 11 is started to resume the suction/discharge of brake fluid by the pump 7. After the time t8, the opening degree of the fluid pressure adjusting valve SLFR and the rotational speed of the first motor 11 are so adjusted as to gradually change, and sudden changes in the behavior of the vehicle are thereby suppressed.

As described above, in the energization cancellation mode end processing, the fluid pressure adjusting valve SLFR is completely closed, the communication valve SRC1 is then opened, and thereafter the opening degree of the fluid pressure adjusting valve SLFR is adjusted to end the energization cancellation mode. In the energization cancellation mode end processing, when the communication valve SRC1 is opened before the complete closure of the fluid pressure adjusting valve SLFR, the fluid pressure in the wheel cylinder 6FR is abruptly reduced. Thus, pulsations are caused, and abnormal noise and vibrations occur. On the other hand, the fluid pressure in the wheel cylinder 6FR can be prevented from being abruptly reduced by controlling the opening/closing of the respective valves as in the case of this embodiment of the invention. Therefore, the occurrence of pulsations can be suppressed, and as a result, the generation of abnormal noise and vibrations can be suppressed.

Figure 3:
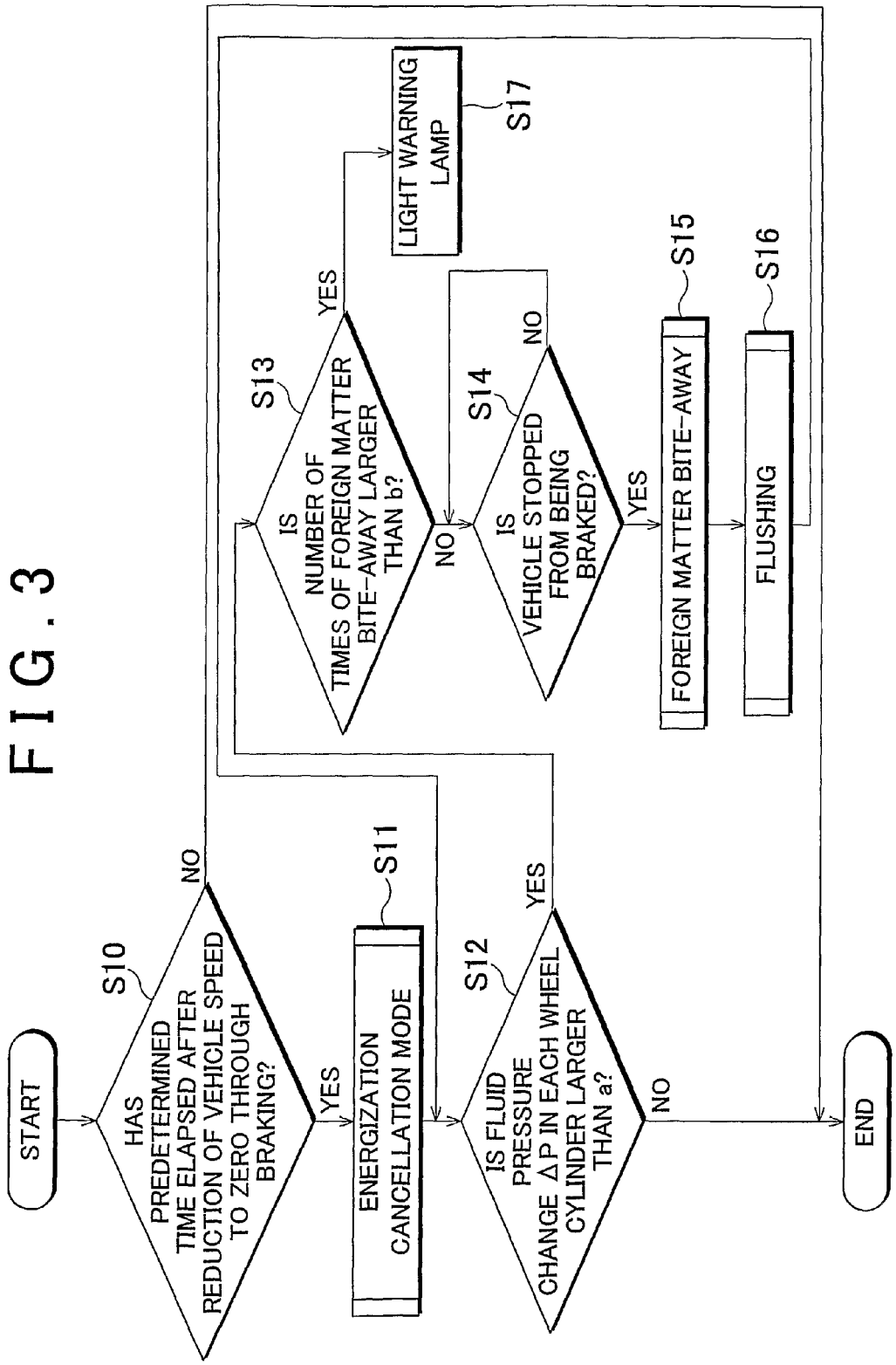
FIG. 3 is a flowchart for explaining a fluid leak determination mode.

Subsequently, a fluid leakage determination mode in the brake control apparatus 100 according to this embodiment of the invention will be described with reference to FIG. 3. FIG. 3 is a flowchart for explaining the fluid leak determination mode. In the fluid leak determination mode, a similar processing is performed in the communication valve SRC1 and the communication valve SRC2. Therefore, the communication valve SRC1 will be described herein as an example. The fluid leak determination mode is established under the control of the brake ECU 200.

In the aforementioned energization cancellation mode, the communication valve SRC1 holds the fluid pressure in the wheel cylinder 6FR. Further, when brake operation is performed at the time of a failsafe, the communication valve SRC1 shuts off the master cylinder 3 from the reservoir tank 3*f* to prevent brake fluid in the master cylinder 3 from flowing toward the reservoir tank 3*f* side and hence hold the fluid pressure in the wheel cylinder 6FR. Therefore, when a fluid leak occurs in the communication valve SRC1, a desired braking force may not be obtained. Thus, in the brake control apparatus 100 according to this embodiment of the invention, a determination on a fluid leak from the communication valve SRC1 is made. The operating reliability of the brake control apparatus 100 is thereby ensured.

In the fluid leak determination mode, it is determined whether or not a fluid leak has occurred, depending on whether or not the fluid pressure on the wheel cylinder 6FR side with respect to the communication valve SRC1 has changed while the communication valve SRC1 holds the fluid pressure in the wheel cylinder 6FR. In this embodiment of the invention, a determination on a fluid leak from the communication valve SRC1 is made utilizing a state where the communication valve SRC1 holds the fluid pressure in the wheel cylinder 6FR in the energization cancellation mode.

As shown in FIG. 3, first of all, after braking forces are applied to the wheels through, for example, depression of the brake pedal 1 and the speed of the vehicle becomes equal to 0 km/h, it is determined whether or not a predetermined time has elapsed (S10). A state where the braking forces are applied to the wheels includes, for example, a state where brake hold control is performed. In brake hold control, with a view to alleviating the load imposed on the driver in operating the brake pedal 1 during a traffic jam or the like, a braking force applied during stoppage of the vehicle is held despite the absence of the operation of the brake pedal 1 when the degree of operation of the brake pedal 1 becomes higher than a predetermined degree during stoppage of the vehicle at a forward position.

When the predetermined time has elapsed (YES in S10), the aforementioned energization cancellation mode is established (S11). It is then determined from a detection result of the fluid pressure sensor 13 whether or not a fluid pressure change amount $\Delta P$ in the wheel cylinder 6FR has become larger than a predetermined amount a (S12). When the fluid pressure change amount $\Delta P$ is equal to or smaller than the predetermined amount a (NO in S12), the fluid leak determination mode is ended.

When the fluid pressure change amount $\Delta P$ has become larger than the predetermined amount a (YES in S12), it is determined whether or not the number of times of a foreign matter bite-away processing has become larger than a predetermined number of times b (S13). The foreign matter bite-away processing will be described later. When the number of times of the foreign matter bite-away processing is equal to or smaller than the predetermined number of times b (NO in S13), it is determined whether or not the vehicle is stopped from being braked through the cancellation of depression of the brake pedal 1 by the driver (S14). When the vehicle is not stopped from being braked (NO in S14), it is repeatedly determined whether or not the vehicle is stopped from being braked (S14).

When the vehicle is stopped from being braked (YES in S14), the foreign matter bite-away processing for the communication valve SRC1 is performed (S15). In the foreign matter bite-away processing for the communication valve SRC1, the energization of the communication valve SRC1 is started/stopped consecutively and repeatedly a plurality of times to consecutively open/close the communication valve SRC1 a plurality of times. When a fluid leak from the communication valve SRC1 occurs due to the sticking of foreign matters such as trash or the like in brake fluid in the communication valve SRC1, the sealability of the communication valve SRC1 can be regained by removing the foreign matters from the communication valve SRC1 through the opening/closing thereof. It should be noted that the foreign matter bite-away processing for the communication valve SRC1 can be performed even when the brake pedal 1 is depressed by the driver (in a state where the vehicle is braked), by completely closing the fluid pressure adjusting valve SLFR and holding the fluid pressure in the wheel cylinder 6FR by means of the fluid pressure adjusting valve SLFR. In this case, the energization of the first motor 11 is stopped.

After the foreign matter bite-away processing for the communication valve SRC1 is performed, a flushing processing for flushing the foreign matters removed from the communication valve SRC1 through the foreign matter bite-away processing is performed in the brake control apparatus 100 according to this embodiment of the invention (S16). In the flushing processing, first of all, the first motor 11 is driven, and the energization of both the shutoff valve SMC1 and the communication valve SRC1 is started to close the shutoff valve SMC1 and open the communication valve SRC1. As a result, brake fluid circulates through the conduits H1 and J1 through the suction/discharge of brake fluid by the pump 7, and foreign matters in the vicinity of the communication valve SRC1 are diffused. Subsequently, the energization of both the shutoff valve SMC1 and the communication valve SRC1 is stopped to open the shutoff valve SMC1 and close the communication valve SRC1. As a result, brake fluid flows to the conduits H1 and F, and the foreign matters are diffused to the master cylinder 3 side. Then, a state where the shutoff valve SMC1 is closed and the communication valve SRC1 is open and a state where the shutoff valve SMC1 is open and the communication valve SRC1 is closed are repeatedly alternated a predetermined number of times at an arbitrary frequency. Further, the foreign matters can be more efficiently flushed by combining the aforementioned operation with an operation of closing the shutoff valve SMC1 and the communication valve SRC1, driving the first motor 11 to raise the fluid pressures in the conduits F and H1 to predetermined pressures, and then opening the shutoff valve SMC1 and the communication valve SRC1 to increase the speed at which brake fluid flows through the conduits F, H1, and J1.

The flushing processing is performed as described above. In the flushing processing, the pump 7 is slowly driven to reduce operation noise. After the flushing processing is performed, it is determined again whether or not the fluid pressure change amount $\Delta P$ in the wheel cylinder 6FR has become larger than the predetermined amount a (S12). When the fluid pressure change amount $\Delta P$ is equal to or smaller than the predetermined amount a (NO in S12), the fluid leak determination mode is ended. When the fluid pressure change amount $\Delta P$ has become larger than the predetermined amount a (YES in S12), it is determined whether or not the number of times of the foreign matter bite-away processing has become larger than the predetermined number of times b (S13). The aforementioned processing is repeated until the number of times of the foreign matter bite-away processing becomes larger than the predetermined number of times b. When the number of times of the foreign matter bite-away processing has become larger than the predetermined number of times b (YES in S13), a warning lamp (not shown) is lit to notify the driver of a fluid leak from the communication valve SRC1 (S17).

According to the fluid leak determination mode described above, the operating reliability of the brake control apparatus 100 can be enhanced by making a determination on a fluid leak from the communication valve SRC1 and performing the foreign matter bite-away processing and the flushing processing. Further, in this fluid leak determination mode, even when a fluid leak from the communication valve SRC1 is detected, a determination on a fluid leak is repeated by repeatedly performing the foreign matter bite-away processing and the flushing processing the predetermined number of times b instead of notifying the driver immediately. Therefore, it is possible to avoid a situation in which the warning lamp is frequently lit and the driver has to inspect the brake control apparatus 100 every time the warning lamp is lit. It should be noted that the foreign matter bite-away processing and the flushing processing can be appropriately combined with each other and performed. For example, one of the processings can be performed in succession a plurality of times, or only one of the processings can be performed. Further, the aforementioned energization cancellation mode and the aforementioned fluid leak determination mode can be established through the execution of a program stored in a memory (not shown) by the brake ECU 200.

To summarize the operation and effect of the configuration described above, the brake control apparatus 100 according to this embodiment of the invention is equipped, in the fluid pressure circuits thereof, with the pumps 7, 8, 9, and 10, the first motor 11, the second motor 12, the fluid pressure adjusting valves SLFR, SLFL, SLRR, and SLRL that are open during stoppage of energization and have opening degrees thereof adjusted through energization control, and the communication valves SRC1 and SRC2 that are closed during stoppage of energization and are provided downstream of the fluid pressure adjusting valves SLFR and SLFL respectively. The brake ECU 200 then establishes the energization cancellation mode. That is, the brake ECU 200 opens the communication valves SRC1 and SRC2, adjusts the opening degrees of the fluid pressure adjusting valves SLFR, SLFL, SLRR, and SLRL to adjust the fluid pressures supplied to the wheel cylinders 6FR, 6FL, 6RR, and 6RL respectively, and then closes the communication valves SRC1 and SRC2 and opens the fluid pressure adjusting valves SLFR and SLFL to hold the fluid pressures supplied to the wheel cylinders 6FR and 6FL by means of the communication valves SRC1 and SRC2 respectively. Accordingly, the fluid pressures in the wheel cylinders 6FR and 6FL are held while the respective valves are not energized, and the loads imposed on the respective valves through energization can be reduced. As a result, the operating reliability of the brake control apparatus 100 is enhanced. Further, the electric power consumed by the brake control apparatus 100 during brake control can be reduced.

Further, the brake ECU 200 adjusts the opening degrees of the fluid pressure adjusting valves SLFR and SLFL to adjust the fluid pressures, then closes the fluid pressure adjusting valves SLFR and SLFL, then closes the communication valves SRC1 and SRC2, and subsequently opens the fluid pressure adjusting valves SLFR and SLFL to hold the fluid pressures by means of the communication valves SRC1 and SRC2 respectively. Therefore, the occurrence of pulsations through the opening/closing of the respective valves can be suppressed, and as a result, the occurrence of abnormal noise and vibrations can be suppressed.

Further, in the energization cancellation mode end processing, the brake ECU 200 closes the fluid pressure adjusting valves SLFR and SLFL, then opens the communication valves SRC1 and SRC2, and subsequently adjusts the opening degrees of the fluid pressure adjusting valves SLFR and SLFL to release the fluid pressures supplied to the wheel cylinders 6FR and 6FL respectively during stoppage of energization. Therefore, the occurrence of pulsations through the opening/closing of the respective valves can be suppressed, and as a result, the occurrence of abnormal noise and vibrations can be suppressed.

Furthermore, in the brake control apparatus 100 according to this embodiment of the invention, the fluid leak determination for detecting a fluid leak from the communication valves SRC1 and SRC2 is made from the detection results of the fluid pressure sensors 13 and 16 in the energization cancellation mode. Thus, the operating reliability of the brake control apparatus 100 can be enhanced. Further, when a fluid leak is detected, the foreign matter bite-away processing and the flushing processing are performed. Thus, the operating reliability of the brake control apparatus 100 can further be enhanced, and a situation in which the driver has to inspect the brake control apparatus 100 frequently can be avoided.

Modification Examples

Figure 4:
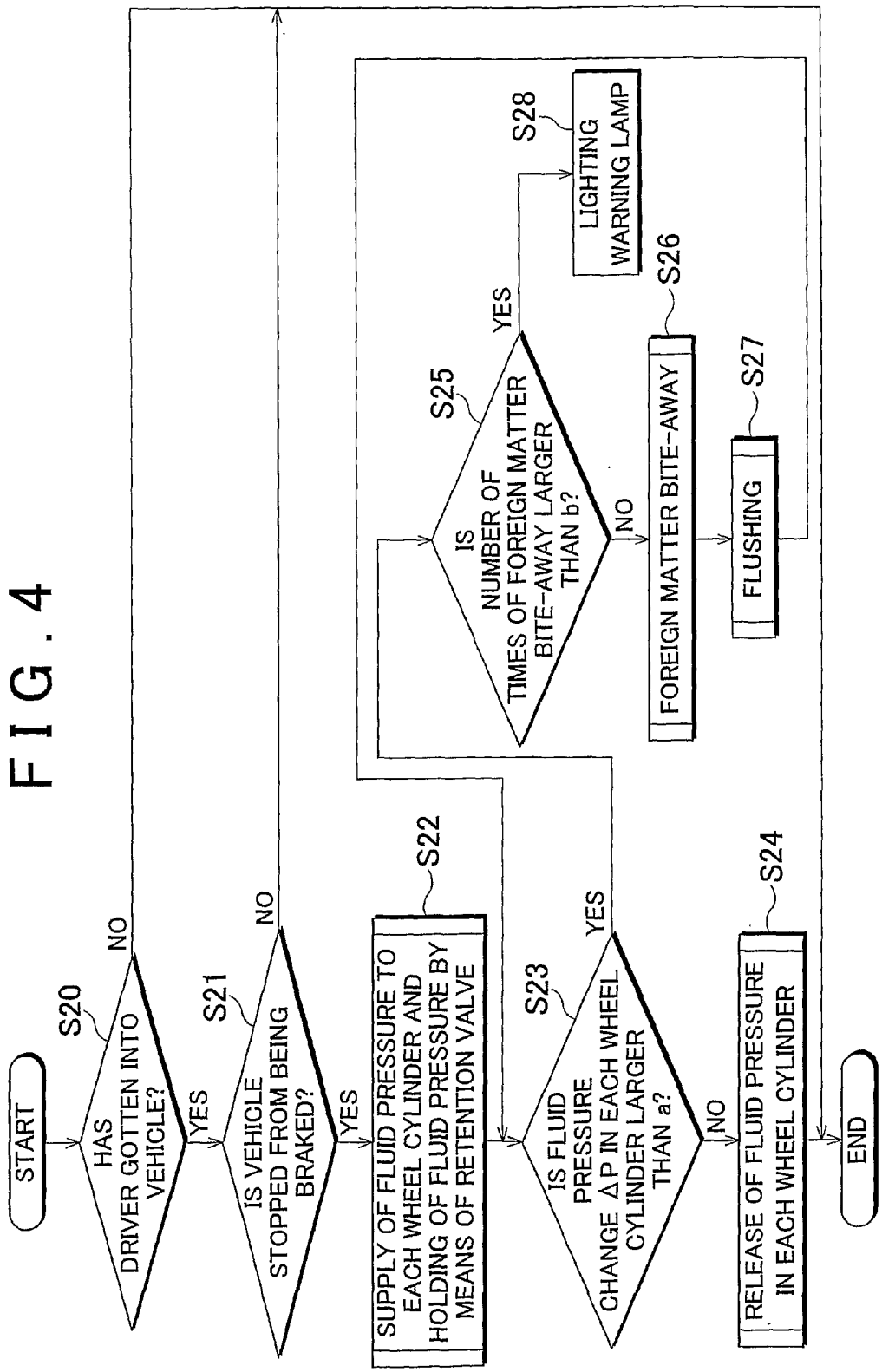
FIG. 4 is a flowchart for explaining a fluid leak determination mode according to a first modification example of the first embodiment of the invention.
Figure 5:
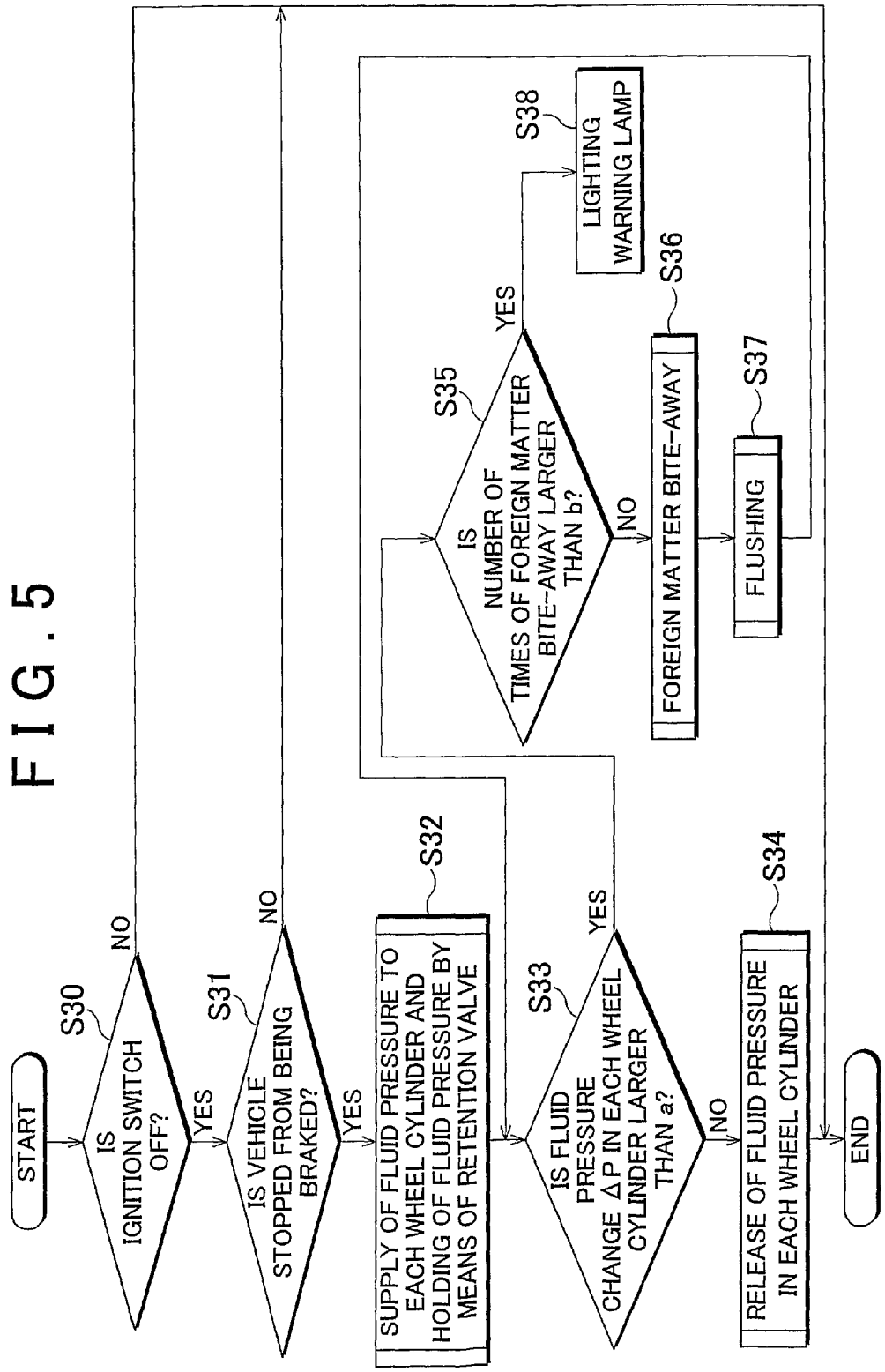
FIG. 5 is a flowchart for explaining a fluid leak determination mode according to a second modification example of the first embodiment of the invention.

As a timing for establishing the fluid leak determination mode in the brake control apparatus 100 according to this embodiment of the invention, modification examples as shown in FIGS. 4 and 5 can be mentioned. FIG. 4 is a flowchart for explaining a fluid leak determination mode according to the first modification example of the first embodiment of the invention. FIG. 5 is a flowchart for explaining a fluid leak determination mode according to the second modification example of the first embodiment of the invention. In the fluid leak determination mode, a similar processing is performed in the communication valve SRC1 and the communication valve SRC2. Therefore, the communication valve SRC1 will be described herein as an example.

In the first modification example, a determination on a fluid leak from the communication valve SRC1 is made at a timing when the driver gets into the vehicle. As shown in FIG. 4, it is first determined whether or not the driver has gotten into the vehicle (S20). The entrance of the driver into the vehicle can be detected by determining, for example, whether or not a courtesy switch for outputting an electric signal in accordance with an open/closed state of a door is on, whether or not a keyless entry switch is on, or the like. When the driver has not gotten into the vehicle (NO in S20), the fluid leak determination mode is ended.

When the driver has gotten into the vehicle (YES in S20), it is determined whether or not the vehicle is stopped from being braked due to the absence of depression of the brake pedal 1 by the driver (S21). When the vehicle is not stopped from being braked (NO in S21), the fluid leak determination mode is ended.

When the vehicle is stopped from being braked (YES in S21), a fluid pressure is supplied to the wheel cylinder 6FR, and there is formed a state where the fluid pressure supplied to the wheel cylinder 6FR is held by the communication valve SRC1 (S22). The opening/closing of the respective valves and drive control of the motors, which are accompanied by the supply of the fluid pressure to the wheel cylinder 6FR and the state of holding the fluid pressure by means of the communication valve SRC1, are carried out in the same manner as in the case of the aforementioned energization control mode. That is, first of all, the energization of the shutoff valve SMC1 and the communication valve SRC1 is started to close the shutoff valve SMC1 and open the communication valve SRC1. Subsequently, the energization of the first motor 11 and the fluid pressure adjusting valve SLFR is started to drive the first motor 11 and adjust the opening degree of the fluid pressure adjusting valve SLFR, and a fluid pressure is supplied to the wheel cylinder 6FR. Subsequently, the energization of the first motor 11 is stopped, the fluid pressure adjusting valve SLFR is completely closed, the communication valve SRC1 is closed, and the fluid pressure adjusting valve SLFR is completely opened.

Subsequently, it is determined from the detection result of the fluid pressure sensor 13 whether or not the fluid pressure change amount $\Delta P$ in the wheel cylinder 6FR has become larger than the predetermined amount a (S23). When the fluid pressure change amount $\Delta P$ is equal to or smaller than the predetermined amount a (NO in S23), a processing for releasing the fluid pressure supplied to the wheel cylinder 6FR is performed (S24). The opening/closing of the respective valves and drive control of the motors in the processing for releasing the fluid pressure are carried out in the same manner as in the case of the aforementioned energization cancellation mode end processing. That is, first of all, the fluid pressure adjusting valve SLFR is completely closed, and the communication valve SRC1 is then opened. After that, the energization of the first motor 11 is started, and the opening degree of the fluid pressure adjusting valve SLFR is adjusted to release the fluid pressure supplied to the wheel cylinder 6FR. After that, the fluid leak determination mode is ended.

When the fluid pressure change amount $\Delta P$ has become larger than the predetermined amount a (YES in S23), it is determined whether or not the number of times of the foreign matter bite-away processing has become larger than the predetermined number of times b (S25). When the number of times of the foreign matter bite-away processing is equal to or smaller than the predetermined number of times b (NO in S25), the foreign matter bite-away processing for the communication valve SRC1 is performed (S26), and the flushing processing is then performed (S27). After the flushing processing is performed, it is determined again whether or not the fluid pressure change amount $\Delta P$ in the wheel cylinder 6FR has become larger than the predetermined amount a (S23). When the fluid pressure change amount $\Delta P$ is equal to or smaller than the predetermined amount a (NO in S23), a wheel cylinder fluid pressure cancellation processing is performed (S24), and the fluid leak determination mode is then ended. When the fluid pressure change amount $\Delta P$ has become larger than the predetermined amount a (YES in S23), it is determined whether or not the number of times of the foreign matter bite-away processing has become larger than the predetermined number of times b (S25). The aforementioned processings are repeated until the number of times of the foreign matter bite-away processing becomes larger than the predetermined number of times b. When the number of times of the foreign matter bite-away processing has become larger than the predetermined number of times b (YES in S25), the warning lamp (not shown) is lit to notify the driver of a fluid leak from the communication valve SRC1 (S28). The fluid leak determination mode according to the first modification example is established as described above.

In the second modification example, a determination on a fluid leak from the communication valve SRC1 is made at a timing when an ignition switch is turned off. In general, the brake ECU 200 holds (self-sustains) a driving state for several minutes even after the ignition switch is turned off. Therefore, the fluid leak determination mode can be established at this timing.

As shown in FIG. 5, it is first determined whether or not the ignition switch is off (S30). When the ignition switch is not off (NO in S30), the fluid leak determination mode is ended.

When the ignition switch is off (YES in S30), it is determined whether or not the vehicle is stopped from being braked due to the absence of depression of the brake pedal 1 by the driver (S31). When the vehicle is not stopped from being braked (NO in S31), the fluid leak determination mode is ended.

When the vehicle is stopped from being braked (YES in S31), a fluid pressure is supplied to the wheel cylinder 6FR, and there is formed a situation in which the fluid pressure supplied to the wheel cylinder 6FR is held by the communication valve SRC1 (S32). The opening/closing of the respective valves and drive control of the motors, which are accompanied by the supply of the fluid pressure to the wheel cylinder 6FR and the state of holding the fluid pressure by means of the communication valve SRC1, are carried out in the same manner as in the case of the aforementioned energization control mode.

Subsequently, it is determined from a detection result of the fluid pressure sensor 13 whether or not the fluid pressure change amount $\Delta P$ in the wheel cylinder 6FR has become larger than the predetermined amount a (S33). When the fluid pressure change amount $\Delta P$ is equal to or smaller than the predetermined amount a (NO in S33), a processing of releasing the fluid pressure supplied to the wheel cylinder 6FR is performed (S34). The opening/closing of the respective valves and drive control of the motors in the processing of releasing the fluid pressure are carried out in the same manner as in the case of the aforementioned energization cancellation mode end processing. After that, the fluid leak determination mode is ended.

When the fluid pressure change amount $\Delta P$ has become larger than the predetermined amount a (YES in S33), it is determined whether or not the number of times of the foreign matter bite-away processing has become larger than the predetermined number of times b (S35). When the number of times of the foreign matter bite-away processing is equal to or smaller than the predetermined number of times b (NO in S35), the foreign matter bite-away processing for the communication valve SRC1 is performed (S36), and the flushing processing is then performed (S37). After the flushing processing is performed, it is determined again whether or not the fluid pressure change amount $\Delta P$ in the wheel cylinder 6FR has become larger than the predetermined amount a (S33). When the fluid pressure change amount $\Delta P$ is equal to or smaller than the predetermined amount a (NO in S33), the wheel cylinder fluid pressure release processing is performed (S34), and the fluid leak determination mode is ended. When the fluid pressure change amount $\Delta P$ has become larger than the predetermined amount a (YES in S33), it is determined whether or not the number of times of the foreign matter bite-away processing has become larger than the predetermined number of times b (S35). The aforementioned processings are repeated until the number of times of the foreign matter bite-away processing becomes larger than the predetermined number of times b. When the number of times of the foreign matter bite-away processing has become larger than the predetermined number of times b (YES in S35), the warning lamp (not shown) is lit to notify the driver of a fluid leak from the communication valve SRC1 (S38). The fluid leak determination mode according to the second modification example is established as described above.

The operating reliability of the brake control apparatus 100 can also be enhanced through the fluid leak determination mode according to the first modification example described above and the fluid leak determination mode according to the second modification example described above. Even except in the aforementioned modification examples, the fluid leak determination mode can be established when, for example, a shift lever is at a parking position, or a parking brake is on.

The brake control apparatus 100 according to the second embodiment of the invention is different from the brake control apparatus according to the first embodiment of the invention in being equipped with conduits K and M coupling the region downstream of the communication valve SRC1 to the reservoir tank 3f, and conduits L and N coupling the region downstream of the communication valve SRC2 to the reservoir tank 3f. The second embodiment of the invention will be described hereinafter. The brake control apparatus 100 is basically identical to that of the first embodiment of the invention in other configurational details, the processing of establishing the energization cancellation mode, the determination on the fluid leak, and the foreign matter bite-away processing. Components identical to those of the first embodiment of the invention are denoted by the same reference symbols respectively, and the description thereof is omitted when appropriate.

Figure 6:
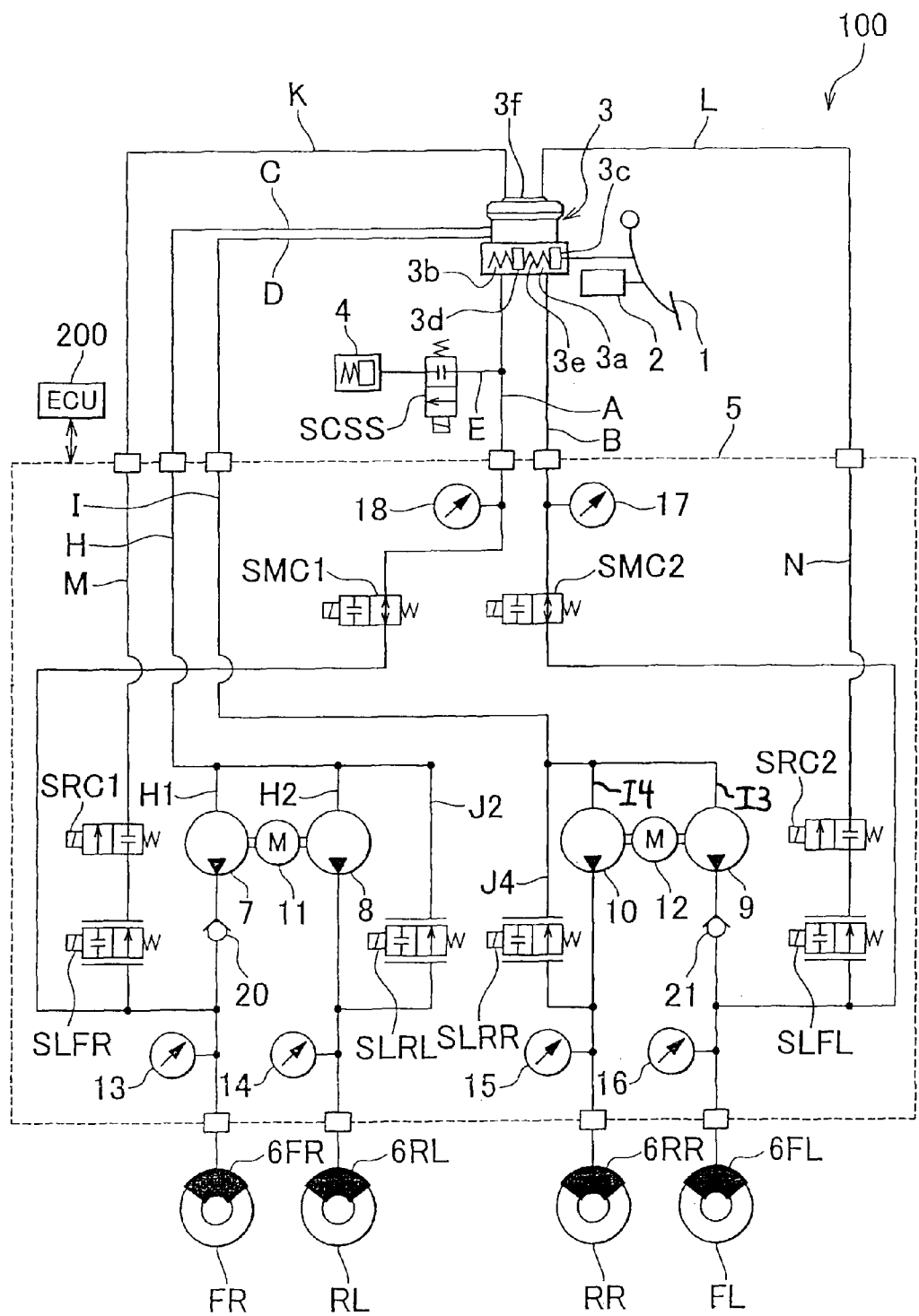
FIG. 6 is a schematic diagram of a brake control apparatus according to the second embodiment of the invention.

FIG. 6 is a schematic diagram of the brake control apparatus 100 according to the second embodiment of the invention. The brake control apparatus 100 according to this embodiment of the invention is equipped, in the fluid pressure circuits thereof, with the pumps 7, 8, 9, and 10, the first motor 11, the second motor 12, the fluid pressure adjusting valves SLFR, SLFL, SLRR, and SLRL that are open during stoppage of energization and have opening degrees thereof adjusted through energization control, and the communication valves SRC1 and SRC2 that are closed during stoppage of energization and are provided downstream of the fluid pressure adjusting valves SLFR and SLFL respectively. The brake ECU 200 then establishes the energization cancellation mode. That is, the brake ECU 200 opens the communication valves SRC1 and SRC2, adjusts the opening degrees of the fluid pressure adjusting valves SLFR, SLFL, SLRR, and SLRL to adjust the fluid pressures supplied to the wheel cylinders 6FR, 6FL, 6RR, and 6RL respectively, and then closes the communication valves SRC1 and SRC2 and opens the fluid pressure adjusting valves SLFR and SLFL respectively to hold the fluid pressures supplied to the wheel cylinders 6FR and 6FL by means of the communication valves SRC1 and SRC2 respectively.

Further, the brake ECU 200 adjusts the opening degrees of the fluid pressure adjusting valves SLFR and SLFL to adjust the fluid pressures, closes the fluid pressure adjusting valves SLFR and SLFL, then closes the communication valves SRC1 and SRC2, and subsequently opens the fluid pressure adjusting valves SLFR and SLFL to hold the fluid pressures by means of the communication valves SRC1 and SRC2 respectively. Furthermore, in the energization cancellation mode end processing, the brake ECU 200 closes the fluid pressure adjusting valves SLFR and SLFL, then opens the communication valves SRC1 and SRC2, and subsequently adjusts the opening degrees of the fluid pressure adjusting valves SLFR and SLFL to release the fluid pressures supplied to the wheel cylinders 6FR and 6FL respectively during stoppage of energization.

Further, the brake control apparatus 100 according to this embodiment of the invention makes a fluid leak determination of detecting a fluid leak from the communication valves SRC1 and SRC2 from detection results of the fluid pressure sensors 13 and 16 respectively when, for example, the energization cancellation mode is established, the driver gets into the vehicle, or the ignition switch is turned off. When a fluid leak is detected in the fluid leak determination, the foreign matter bite-away processing for the communication valves SRC1 and SRC2 and the later-described flushing processing are performed.

Further, in the brake control apparatus 100 according to this embodiment of the invention, the conduits K and L are extended from the reservoir tank 3f to the brake fluid pressure control actuator 5. The brake fluid pressure control actuator 5 is provided with the conduit M connected in parallel with the pump 7, and the conduit N connected in parallel with the pump 9. The conduit M is equipped with the communication valve SRC1 and the fluid pressure adjusting valve SLFR that are connected in series to each other, and the region downstream of the communication valve SRC1 is coupled to the conduit K. Further, the conduit N is equipped with the communication valve SRC2 and the fluid pressure adjusting valve SLFL that are connected in series to each other, and the region downstream of the communication valve SRC2 is coupled to the conduit L. The conduits K, L, M, and N constitute the return conduit.

In the brake control apparatus 100 according to this embodiment of the invention having the aforementioned configuration, foreign matters can be efficiently diffused simply by driving the pumps 7 and 9 while the shutoff valves SMC1 and SMC2 are closed and the communication valves SRC1 and SRC2 are open in performing the flushing processing. That is, the pumps 7 and 9 are driven, the energization of both the shutoff valves SMC1 and SMC2 and the communication valves SRC1 and SRC2 is started to close the shutoff valves SMC1 and SMC2 and open the communication valves SRC1 and SRC2. As a result, brake fluid flows from the conduits H1 and H2 to the conduits M and N and is sent to the reservoir tank 3f through the conduits K and L due to the suction/discharge of brake fluid by the pumps 7 and 9 respectively. In consequence, foreign matters in the vicinity of the communication valves SRC1 and SRC2 are diffused to the reservoir tank 3f side.

Therefore, according to the brake control apparatus 100 according to this embodiment of the invention, the flushing processing can further be simplified in addition to the effect achieved in the first embodiment of the invention. As a result, the loads applied to the respective valves are reduced, and an effect of enhancing the operating reliability of the brake control apparatus 100 is achieved.

The invention should not be limited to the foregoing embodiments thereof. A suitable combination of the respective elements of the embodiments of the invention is also valid as an embodiment of the invention. Further, the embodiments of the invention can be subjected to various modifications such as design changes and the like on the basis of the knowledge of those skilled in the art, and the embodiments of the invention subjected to those modifications can also be included in the scope of the invention. The configuration shown in each of the drawings is intended to illustrate an example. As long as a similar function can be achieved, this configuration can be suitably changed to obtain a similar effect.

For example, in each of the foregoing embodiments of the invention, the respective valves SCSS, SMC1, SMC2, SRC1, SRC2, SLFR, SLFL, SLRR, and SLRL, the first motor 11, and the second motor 12 are all not driven in the event of an abnormality. However, the following configuration can also be adopted.

For example, if a region where the abnormality occurs can be specified, only the respective portions of the pipeline system including the region where the abnormality occurs can be stopped from being driven, and a braking force can be generated utilizing the pipeline system that does not include that region. Further, even when the first motor 11 or the second motor 12 in only one of the pipeline systems is driven as in this case, a fluid pressure corresponding to depression of the brake pedal 1 can be generated for the other pipeline system. Thus, the pipeline system for generating a fluid pressure in the wheel cylinder on the basis of the driving of the first motor 11 or the second motor 12, and the pipeline system for generating a fluid pressure in the wheel cylinder on the basis of depression of the brake pedal 1 can be provided separately.

The invention claimed is:

1. A brake control apparatus that supplies a brake fluid to a wheel cylinder via a fluid pressure circuit to thereby supply a fluid pressure to the wheel cylinder and apply a braking force to a wheel through the fluid pressure, comprising:
   a fluid pressure source that is provided in the fluid pressure circuit to supply a fluid pressure to the wheel cylinder;
   a fluid pressure adjusting valve that is open during stoppage of energization, and has an opening degree thereof adjusted through energization control to adjust the fluid pressure supplied to the wheel cylinder;
   a communication valve that is provided in series with the fluid pressure adjusting valve, is closed during stoppage of energization to hold the fluid pressure supplied to the wheel cylinder, and is opened through energization;
   a fluid pressure sensor that detects the fluid pressure; and
   a control portion that controls driving of the fluid pressure source and energization of the fluid pressure adjusting valve and the communication valve,
   wherein the control portion controls fluid pressure adjustment achieved by driving the fluid pressure source to supply the fluid pressure to the wheel cylinder, opening the communication valve, and adjusting the opening degree of the fluid pressure adjusting valve to adjust the fluid pressure, and fluid pressure holding achieved by closing the communication valve, opening the fluid pressure adjusting valve, and holding the fluid pressure by means of the communication valve, and
   wherein the control portion closes the fluid pressure adjusting valve, then closes the communication valve, and subsequently opens the fluid pressure adjusting valve to hold the fluid pressure by means of the communication valve.

2. The brake control apparatus according to claim 1, wherein the control portion closes the fluid pressure adjusting valve, then opens the communication valve, and subsequently adjusts the opening degree of the fluid pressure adjusting valve to release the fluid pressure supplied to the wheel cylinder.

3. The brake control apparatus according to claim 1, wherein the control portion makes a fluid leak determination to detect a fluid leak from the communication valve from a detection result of the fluid pressure sensor while the communication valve holds the fluid pressure.

4. The brake control apparatus according to claim 3, wherein the control portion consecutively opens/closes the communication valve a plurality of times when the fluid leak from the communication valve is detected in the fluid leak determination.

5. The brake control apparatus according to claim 3, wherein the control portion opens the communication valve and drives the fluid pressure source to cause the brake fluid to flow when the fluid leak from the communication valve is detected in the fluid leak determination.

6. The brake control apparatus according to claim 3, further comprising:
   an additional fluid pressure circuit for supplying the brake fluid to the wheel cylinder, and
   a shutoff valve that is provided in the additional fluid pressure circuit and is closed through energization to enable shutoff of supply of the brake fluid to the wheel cylinder,
   wherein the control portion closes the communication valve, opens the shutoff valve, and drives the fluid pressure source to cause the brake fluid to flow when the fluid leak from the communication valve is detected in the fluid leak determination.

7. The brake control apparatus according to claim 3, further comprising:
   a reservoir tank that stores the brake fluid therein, and
   a return conduit that couples a region downstream of the communication valve to the reservoir tank, wherein
   the communication valve is provided downstream of the fluid pressure adjusting valve,
   the fluid pressure source supplies the brake fluid from the reservoir tank to the wheel cylinder via the fluid pressure circuit, and
   the brake fluid supplied to the wheel cylinder is returned to the reservoir tank via the return conduit.

8. The brake control apparatus according to claim 3, wherein the fluid leak determination is made at a timing when the fluid pressure is supplied to the wheel cylinder to apply the braking force to the wheel.

9. The brake control apparatus according to claim 3, wherein the fluid leak determination is made at a timing when a user gets into a vehicle.

10. The brake control apparatus according to claim 3, wherein the fluid leak determination is made when an ignition switch is turned off to stop braking.

11. The brake control apparatus according to claim 1, further comprising:
    an additional fluid pressure circuit for supplying the brake fluid to the wheel cylinder, and
    a shutoff valve that is provided in the additional fluid pressure circuit and is closed through energization to enable shutoff of supply of the brake fluid to the wheel cylinder, wherein
    the wheel cylinder is supplied with the brake fluid through the fluid pressure circuit during energization, and
    the wheel cylinder is supplied with the brake fluid through the additional fluid pressure circuit during stoppage of energization.

* * * * *